INVENTORS
SVANTE KLINGOFSTROM AND
ERNST STURE LENNART SVENSSON

United States Patent Office 3,400,523
Patented Sept. 10, 1968

3,400,523
LAWN MOWERS
Svante Klingofstrom and Ernst Sture Lennart Svensson, Malmo, Sweden, assignors to Flymo Societe Anonyme, Geneva, Switzerland
Filed June 11, 1965, Ser. No. 463,132
Claims priority, application Great Britain, June 20, 1964, 25,598/64
7 Claims. (Cl. 56—25.4)

ABSTRACT OF THE DISCLOSURE

A power lawn mower of the rotary type, having a discharge chute for discharging the grass clippings and comprising a rotary impeller and a cutter blade mounted on the same power driven shaft, the impeller and cutter blade being enclosed within a housing which has an air intake in its upper portion and a bottom opening confined by a continuous boundary having its bottom face located substantially in a plane, said continuous boundary being located at a distance above the ground which is small enough to substantially restrict escape of air between the housing and the ground. The air pressure created within the housing by the aforesaid rotary impeller is sufficient to cause the grass clippings to be expelled through the discharge chute under pressure and, at the same time, in one embodiment of the invention, to cause the housing and its associated parts to be elevated slightly above the ground by the air escaping between said continuous boundary and the adjacent ground. In another embodiment, the housing is provided with wheels and the air pressure within the housing is maintained through the use of a flexible curtain extending downwardly from the lower edge of the housing to a plane near the ground.

---

Figure 1:
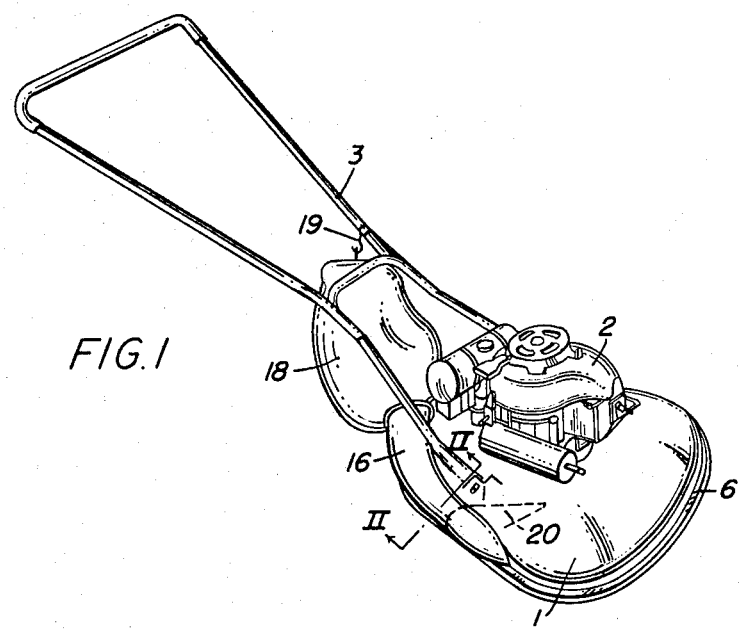

This invention relates to grass cutting machines, or lawn movers, and more particularly to grass cutting machines of the power operated type and provided with a discharge chute for discharging the grass clippings.

In known mowers of the kind referred to, the discharging of the grass clippings is a result of the mechanical impact caused by the cutter during the cutting as well as of the air current product by the air cutter and in some cases also by a blower wheel provided in addition to the cutter. However, it is difficult to obtain a substantial impact effect on the very light grass clippings, and the air current hitherto used is caused by a so small pressure drop that the conveying effect is insufficient when mowing wet grass. Therefore, the discharge chutes hitherto used have been made very short and wide and they have been fitted on the housing very near the path of the cutter. This is disadvantageous from the point of view of safety because in attempting to clear obstructions the operator may put his fingers down the chute into the path of the cutter, or stones or the like may be ejected from the chute at a dangerous speed.

It is an object of the invention to provide an improved power operated grass cutting machine in which means are provided for discharging the grass clippings in an efficient and safe manner.

Another object of the invention is to provide an improved power operated machine which is capable of discharging the grass clippings in such a manner that the danger of clogging, when cutting wet grass, is substantially reduced.

A further object of the invention is to construct a power operated grass cutting machine with grass clippings discharge means adapted to reduce the danger of the ejection of stones and the like to a minimum.

A still further object of the invention is to construct a power operated grass cutting machine with grass clippings discharge means of a kind not permitting access through same to the zone of the rotary cutter of the machine.

A still further object of the invention is to provide a power operated grass cutting machine which is capable of cutting grass and discharging the grass clippings while being smoothly movable across the ground in all directions with a minimum of resistance.

With these and other objects in view, according to one aspect of the invention, a grass cutting machine is provided which comprises a housing having a bottom opening confined by a continuous boundary having its bottom face located substantially in a plane, a rotary cutter and a blower wheel rotatably mounted in said housing on a substantially vertical power driven shaft, and a discharge chute connected to said housing for discharging grass clippings therefrom, the grass cutting machine being so constructed that during operation of same said bottom face of said continuous boundary is kept at a distance above the ground small enough to substantially restrict escape of air between said housing and the ground.

According to another aspect of the invention, a wheelless grass cutting machine is provided which has a power operated rotary cutter and commonly driven air impelling means for producting ground effect to support said machine on a cushion of air at a distance above the ground, said grass cutting machine further comprising a grass clippings discharge outlet constructed in such a manner as to offer a sufficient resistance to the flow of air so as not to prevent the occurrence of said ground effect. Further, the housing of the machine has the discharge opening or outlet thereof located radially outwardly of both the blower wheel and the rotary cutter, both the wheel and the cutter being mounted on a common vertical shaft with the blower wheel above the cutter and arranged to discharge air outwardly over the rotary cutter and into the discharge opening, thus to clear the cutter of the grass clippings and carry them into and through the discharge opening for discharge through the spout with which the opening communicates.

Futher objects and features of the invention will be apparent from the following detailed description of two embodiments thereof, reference being made to the accompanying drawings in which—

Figure 2:
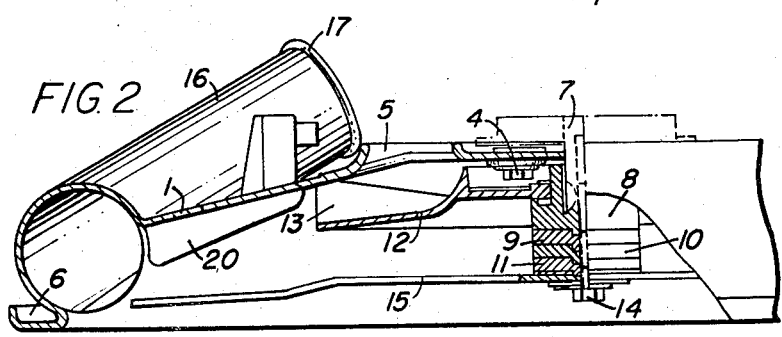
Figure 3:
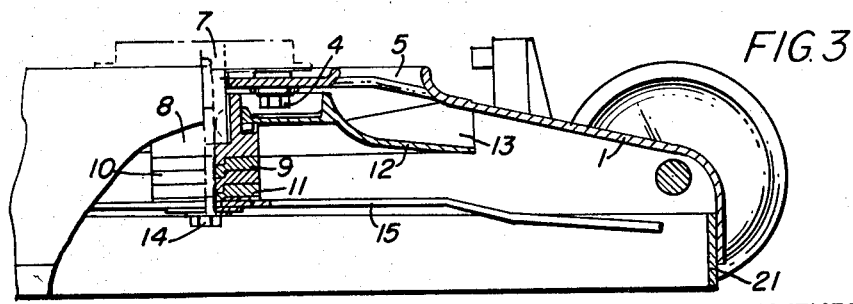

FIG. 1 is a perspective view of a first form of a lawn mower in accordance with the invention, FIG. 2 is a partial view on a larger scale in vertical section on the line II—II in FIG. 1, and FIG. 3 is a partial view in vertical section of a second form of a lawn mower according to the invention.

Referring to FIGS. 1 and 2, the mower comprises a housing 1 with an internal-combustion engine 2 mounted on the housing 1 which is also provided with a pivotally-mounted handle 3.

As shown in FIG. 2, the engine 2 is secured by bolts 4 on the housing 1. The housing 1 has an air intake opening 5 at its top and a flange rim 6 at its bottom. The engine 2 has a substantially vertical shaft 7 which carries four discs 8, 9, 10 and 11. The disc 8 supports a blower wheel comprising a disc-shaped bottom part 12 and a number of radially-extending vanes 13 mounted on the upper side of the part 12. Between the lower disc 11 and a bolt 14 is clamped a rotary cutter 15 of the kind generally used in the known lawn mowers of the kind referred to.

The engine 7 rotates clockwise (viewed from above) and at the right-hand side of the housing 1 is a discharge chute 16 in the form of a pipe which is bent through about 60° and terminates at the rear part of the housing, a flange 17 being provided at the outlet end of the chute 16.

As shown in FIG. 1, an air-pervious canvas bag 18 is fitted on to the chute 16 and is also supported by a hook 19 mounted on the handle 3.

A baffle plate 20 is mounted inside the housing 1 for directing the grass clippings towards the inlet of the discharge chute 16.

When the engine 2 is started, the blower wheel 12, 13 generates an air pressure in the chamber limited by the housing 1 and the ground on which the rim 6 is resting. As soon as this air pressure is high enough, the lawn mower is supported upon an air cushion and may be propelled by means of the handle 3. A part of the air escapes through the chute 16 and the walls of the air-pervious canvas bag 18 in which the grass clippings are collected. Stones and other hard objects are generally pushed out of the track of the mower by the rim 6, but if they should happen to enter under the rim 6 and be hit by the cutter they lose a substantial part of their energy as they are forced to change direction sideways and upwards when passing through the chute 16, the lower part of which at its outlet end with the flange 17 is at a higher level than its higher part at its connection to the housing 1.

By referring to FIGURE 2 of the drawing, it will be noted that the discharge opening or outlet constituting the entrance to the discharge chute 16, is formed in the housing at a location which is radially outwardly of both the blower wheel 12 and the rotary cutter 15, the cutter being of substantially greater radial extent than the blower wheel and the blower wheel thus being arranged to discharge air outwardly over the rotary cutter and into the discharge opening so as to assist in carrying grass clippings from the cutter into the discharge chute 16. Thus, the rotary blower wheel 12 serves the multiple functions of supplying air to support the machine for movement over the ground by the well-known ground effect; it carries the grass clippings from the outer ends of the cutter blades into the discharge chute and, further, provides pressurized air to cause an air flow through the discharge chute which thus functions as a pneumatic conveyor for carrying the grass clippings through the chute.

If no collecting bag 18 is used, the air-cushion effect will decrease substantially and there will be almost no possibility of the entrance of stones under the rim 6.

However, the invention is not limited to mowers adapted to be supported on air-cushions. As will be seen from FIG. 3 the housing of an ordinary wheel-supported mower, of the kind referred to, may be provided with a flexible rubber skirt 21 for creating a boundary for restricting the escape of air. In this connection it should be remembered that wheel-supported mowers generally are more than twice as heavy as corresponding air-cushion supported mowers of the same size. Thus an air pressure inside the housing of the embodiment of FIG. 3 may be of the same magnitude as that obtained in the embodiment of FIGURES 1 and 2, but may still not be sufficient for lifting the mower high enough to lift the wheels clear of the ground.

In the mower shown in FIGS. 1 and 2 the rim 6 forms a continuous boundary, and in the mower illustrated in FIG. 3 the flexible skirt 21 forms a continuous boundary, and in both instances the continuous boundary is around the lower periphery of the housing 1 and has its lower-most surface or edge substantially in a plane and adapted to restrict the escape of air between the housing 1 and the ground when the mower is in operation.

We claim:
1. A grass cutting machine comprising a housing having a bottom opening confined by a continuous boundary having its bottom face located substantially in a plane, a rotary cutter and a blower wheel rotatably mounted in said housing on a substantially vertical power driven shaft with the blower wheel located above the rotary cutter, an air intake opening in the upper part of said housing above the blower wheel, said housing being formed with a discharge opening located radially outwardly of said blower wheel and said rotary cutter, said blower wheel being arranged to discharge air outwardly over said rotary cutter and into said discharge opening; a discharge chute connected to said housing over said discharge opening for discharging grass clippings therefrom, and means for rotating said shaft, the air pressure created within said housing by said blower wheel during operation of same being such that said bottom face of said continuous boundary is kept at a distance above the ground small enough to substantially restrict escape of air between said housing and the ground, whereby a sufficient outward flow of air through said chute is maintained to afford efficient discharge of grass clippings.

2. The machine defined in claim 1, said continuous boundary being defined by the lower face of a continuous rim portion formed on the housing and surrounding said bottom opening.

3. The machine defined in claim 1, including handle means for defining a principal direction of movement for said machine, said discharge chute extending along the periphery of said housing from a point at one side thereof, as referred to said principal direction of movement, to a point adjacent the rear thereof, said chute being bent through an angle of more than 45°.

4. The machine defined in claim 1, said discharge chute extending at a slope such that the bottom wall of said chute at the outlet end thereof is located at a higher level than the top wall of said chute at its point of connection to said housing.

5. The machine defined in claim 1, said blower wheel consisting in a rotary impeller mounted on said shaft above said rotary cutter, said impeller when in operation creating a flow of air through said discharge chute and also expelling air through said bottom opening along paths and at rates such as cause a slight elevation of said housing and parts carried thereby from the ground by ground effect.

6. The machine defined in claim 5, said discharge chute having means for restricting the flow of air therethrough.

7. The machine defined in claim 5, including an air-pervious grass clippings collecting bag connected to the outlet end of said discharge chute, said bag being constructed of material having substantial resistance to the flow of air therethrough.

References Cited

UNITED STATES PATENTS

| | | | |
|---|---|---|---|
| 2,547,328 | 4/1951 | Koch et al. | 56—25.4 |
| 2,743,567 | 5/1956 | Martin | 56—25.4 |
| 3,110,996 | 11/1963 | Dahlman | 56—25.4 |
| 3,118,267 | 1/1964 | Shaw | 56—25.4 |
| 3,178,872 | 4/1965 | Swindler | 56—25.4 |
| 3,188,787 | 6/1965 | Weiland | 56—25.4 |

ANTONIO F. GUIDA, *Primary Examiner.*